United States Patent [19]
Bietry et al.

[11] Patent Number: 5,703,721
[45] Date of Patent: Dec. 30, 1997

[54] OPTICAL MAGNIFIER

[75] Inventors: Joseph R. Bietry; Lee R. Estelle, both of Rochester; Paul D. Ludington, Brockport, all of N.Y.

[73] Assignee: Eastman Kodak Company, Rochester, N.Y.

[21] Appl. No.: 562,666

[22] Filed: Nov. 27, 1995

[51] Int. Cl.$^6$ .................. G02B 25/00; G02B 13/18; G02B 27/42

[52] U.S. Cl. .................. 359/646; 359/558; 359/717

[58] Field of Search .................. 359/708, 709, 359/710, 711, 712, 713, 714, 715, 716, 717, 718, 719, 643, 644, 645, 646, 558

[56] References Cited

U.S. PATENT DOCUMENTS

| | | |
|---|---|---|
| 3,975,095 | 8/1976 | Minoura et al. |
| 4,094,585 | 6/1978 | Betensky ............... 359/708 |
| 4,171,872 | 10/1979 | Baker ................... 359/708 |
| 4,322,135 | 3/1982 | Freeman ............... 359/711 |
| 4,469,413 | 9/1984 | Shirayanagi .......... 359/718 |
| 5,260,828 | 11/1993 | Londono et al. ....... 359/708 |
| 5,504,628 | 4/1996 | Borchard ............... 359/796 |

OTHER PUBLICATIONS

"Diffractive Optics Applied to Eyepiece Design," Michael D. Missig and G. Michael Morris, *Diffractive Optics: Design, Fabrication, and Applications*, 1994 Technical Digest Series vol. II, Jun. 6–9, 1994, pp. JMC5-1 through JMC5-4.

*Primary Examiner*—Scott J. Sugarman
*Attorney, Agent, or Firm*—Svetlana Z. Short

[57] ABSTRACT

An optical magnifier, preferably having only two elements and including a rear negative surface associated with an object to be viewed, which is aspheric. The aspheric surface follows a formula having a sag which is positive to help effect correction for field curvature, astigmatism and distortion. Preferably the lens has at least one other aspheric surface and a diffractive surface. The diffractive surface is preferably on a curved surface to assist in improving the quality of the magnifier with a limited number of elements.

15 Claims, 3 Drawing Sheets

OPTICAL MAGNIFIER

This invention relates to optical magnifiers (also sometimes referred to herein as "eyepieces") and, more specifically, to optical magnifiers having high power and excellent image quality.

Magnifiers and eyepieces have been used for years to allow direct viewing of slides and other small objects or as part of other optical systems such as telescopes and viewfinders. They have also been suggested for viewing electronic displays on portable electronic devices.

Recent developments in optics in general have suggested the use of aspheres and diffractive surfaces as substitutes for regular spherical surfaces in optical lenses. Aspheres themselves have been in common use for a number of years and provide improved corrections with fewer elements in optical objectives and other optical devices. It has also been suggested that diffractive optics can be used in eyepiece design; see, for example, a paper prepared by M. D. Missig and G. M. Morris and presented to the Optical Society of American June 6 through Jun. 9, 1994. In that paper it was suggested that a conventional eyepiece could be modified to include one or more diffractive surfaces to provide better or comparable correction with fewer elements. For example chromatic aberration could be corrected without the use of negative elements in the eyepiece.

Some of the applications of magnifiers and eyepieces require extremely high quality resolution across a wide field. The applications for such optical systems require relatively low cost and, therefore, require relatively few elements.

SUMMARY OF THE INVENTION

In designing a high quality magnifier, we found there was substantial difficulty in both correcting for field flatness across a field as substantial as 20 to 30 degrees while, at the same time, correcting astigmatism and distortion in the optical system, per se. We are aware of magnifier optical systems which place a negative power aspheric surface relatively close to the object of the magnifier in order to cure field curvature. However, we found that surface adversely affects the astigmatism and distortion correction of the system itself. This is especially true if the optical system is operated at a wide relative aperture, for example, F/2.

We solved this problem by redesigning the negative power aspheric surface so that the contribution to surface "sag" (defined below) from the aspheric terms is positive. When this is done, we found it possible to provide a reasonable compromise between field flatness, astigmatism and distortion that provides much improved overall resolution across a wide field for a magnifier with a relatively small number of elements.

The general aspheric equation for defining the sag (X) for all aspheric surfaces is:

$$X = \frac{CY^2}{1 + \sqrt{1 - (k+1)C^2Y^2}} + DY^4 + EY^6 + FY^8 + GY^{10}$$

According to a preferred embodiment, the magnifier actually has only two elements, one of which is a biconvex lens and the second of which is a very thick lens having a positive front surface and the field flattening negative aspheric surface at its rear. According to further preferred embodiments, others of the surfaces can be aspheric and one or more of the surfaces can include a diffraction pattern to further improve the performance of the optical device with a very small number of elements.

According to a further preferred embodiment, the field flattening negative power aspheric surface associated with the object satisfies the following inequality:

$$0.0 < \frac{S}{EF} < .03$$

wherein EF is the focal length of the lens, S is the incremental sag of the surface at the clear aperture of the lens when $$\frac{H}{EF}$$

is approximately 0.18 and H is the image height. "Incremental sag" is equal to the difference between "sag," as defined by the above equation, and the sag due only to the spheric terms of the equation, with any conic term considered aspheric.

According to another preferred embodiment, the first aspheric term of the equation for the asphere (of the field flattening surface) should be positive or the sag contribution of a conic surface, if included in the aspheric equation, plus the first aspheric term, should be positive.

Using the invention, we have been able to design magnifiers with extremely large MTF's with minimized astigmatism with a small number of elements. This, in turn, provides not only high image quality, but excellent usable depth of focus.

DETAILED DESCRIPTION OF THE INVENTION

Figure 1:
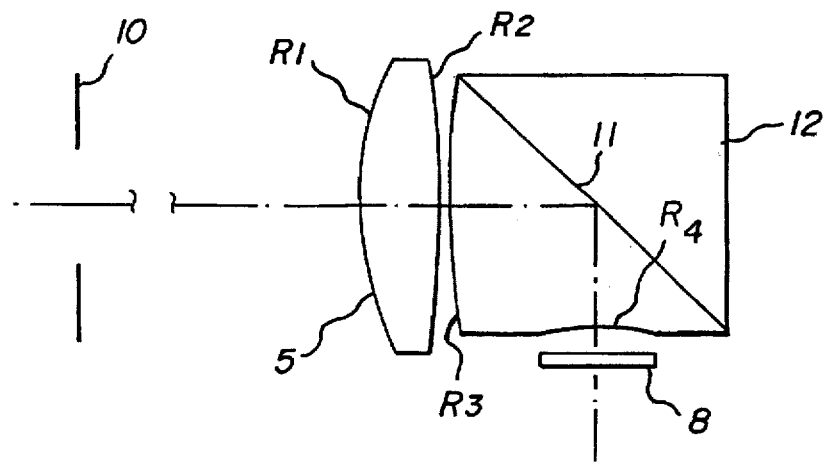
FIG. 1 is a side schematic of an optical magnifier.

In the following descriptions the term "magnifier" will be used, in most instances, to describe the optical system disclosed and claimed. However, a person skilled in the art will understand it can be used as an eyepiece with other optical components and should not be considered limited to any particular application. Note that, since light can be directed through this lens in either direction, the eye position could be replaced by a mirror galvanometer or a rotating polygon aid with some minor distortion adjustments. Thus, a "magnifier" constructed according to the invention could be utilized for scanner applications. The terms "front" and "rear" refer to the eye and object side of the magnifier, respectively, when used as an ordinary magnifier.

As seen in the drawing, a magnifier is made up of two elements, a biconvex element 5 and a prism 12. The prism includes a reflective surface 11 which "folds" the optical system for convenience in a particular application of the system. The fold does not, in fact, directly affect the optical performance of the system, and the invention can be used without it. The optical system creates a virtual image of an object placed at the rear surface of a cover plate 8 as viewed by an eye positioned in front of a diaphragm 10.

According to preferred embodiments, the front element 5 has two positively curved surfaces $R_1$ and $R_2$ and the prism has a positively curved surface $R_3$ and a negatively curved surface $R_4$. Any of the surfaces can be aspheres and any of the surfaces can include a diffractive pattern to help in the optical correction of the system. In each of the Examples listed below, at least two of the surfaces are aspheric and one has a diffractive pattern. However, a similar result could be obtained with less aspheric surfaces and diffractive surfaces by increasing the number of surfaces with the addition of a third or fourth element. In the preferred embodiments, extremely high quality imaging is obtained with a very small number of elements using aspheres and diffractive surfaces.

The rearmost surface with power of the optical system, $R_4$, is relatively close to the image plane. For example, it can be within 5 mm of the image plane in a system having an effective focal length of 16 mm. This surface is concave (negative power) to correct the field curvature. Placing a negative power surface in the vicinity of the image plane for field curvature is well known in the art. However, at wider fields and aperture ratios, the negative surface contributes adversely to both astigmatism and distortion. It, thus, becomes difficult to maintain the overall corrections of the magnifier.

We are aware of negative power surfaces used for correcting field curvature which have been made aspheric, adding an aspheric sag to the surface to help in field correction. However, this approach has generally adversely affected astigmatism and distortion when applied across a relatively wide field. We have found that, if the more significant aspheric constants of this surface contribute positively to the curvature of the surface, a better compromise between field curvature, distortion and astigmatism can be obtained.

According to a preferred embodiment, it is preferable that the sag of the $R_4$ asphere at the maximum aperture satisfies the following inequality:

$$0.0 < \frac{S}{EF} < .03$$

where EF is the focal length of the lens, S is the incremental sag at the clear aperture of the lens when $$\frac{H}{EF}$$

is approximately 0.18 and H is the image height at maximum field.

According to another preferred embodiment, the first aspheric term, commonly termed the D term, should be positive or at least the sag contribution of a conic term, if included in the aspheric equation, plus the D term should be positive.

According to further preferred embodiments, excellent corrections have been obtained for a wide field by putting an asphere on at least one other of the surfaces and by including a diffractive pattern on one of the surfaces. For maximum flexibility in design, it preferred that the diffractive pattern be on one of the curved surfaces, thereby providing more degrees of freedom in correcting the lens. In the following examples, aspheres are used on two or three of the surfaces and a diffractive pattern is placed on either the second surface, $R_2$, or the third surface, $R_3$. We believe that the corrections obtained at field angles greater than 20 degrees and F numbers as fast as F2 are better than prior magnifiers or eyepieces with relatively few elements. The lens is quite compact and, if both elements are molded, quite inexpensive to make in quantity.

In the following Examples, 10 is the diaphragm for the eye or other instrument and $R_1$–$R_4$ are surfaces as shown in the drawing from a front, eyeside to a rear, object side. Radii, thicknesses and distances are in millimeters. Unless otherwise specified, the index is for the sodium D line of the spectrum and V is the Abbe number. As set forth above, the general aspheric equation for defining the sag (X) for all aspheric surfaces is:

$$X = \frac{CY^2}{1 + \sqrt{1 - (k+1)C^2Y^2}} + DY^4 + EY^6 + FY^8 + GY^{10}$$

The diffractive surfaces are described by the following phase equation:

$$\Phi(Y) = \frac{2\pi}{\lambda_0} [C_1 Y^2 + C_2 Y^4 + C_3 Y^6 + C_4 Y^8 + C_5 Y^{10}]$$

EXAMPLE 1

In Example 1, $R_1$, $R_2$ and $R_4$ are aspheres and a diffractive pattern is formed on aspheric surface $R_2$.

TABLE 1

| | RADIUS | DISTANCE OR THICKNESS | INDEX | V |
|---|---|---|---|---|
| 10 | DIAPHRAGM | 35.000 | | |
| $R_1$ | ASPHERE | 5.900 | | |
| $R_2$ | ASPHERE | 0.200 | | |
| $R_3$ | 41.8407[(2)] | 15.200 | 1.590 | 30.9 |
| $R_4$ | ASPHERE | | | |

The coefficients for surfaces $R_1$, $R_2$ and $R_4$ are:

| SURF. $R_1$ | C = 0.0712810 | D = −0.4235000E−04 | F = −0.2637200E−08 |
|---|---|---|---|
| | k = 0.0000000 | E = 0.3181400E−06 | G = 0.1004800E−11 |
| | R = 1/C = 14.02898 | | |
| SURF. $R_2$ | C = −0.0187855 | D = 0.2948800E−04 | F = 0.0 |
| | k = 0.0 | E = 0.6327600E−04 | G = 0.6879400E−06 |
| | R = 1/C = 11.9126 | | |
| SURF. $R_4$ | C = 0.0839447 | D = 0.1068000E−02 | F = −0.8642300E−05 |
| | k = 0.0 | E = 0.6327600E | G = 0.6879400E−06 |
| | R = 1/C = 11.9126 | | |

Coefficients for the diffractive surface $R_2$ are:

$C_1$ = −1.399E−03    $C_3$ = 5.0503E−07    $C_5$ = −2.1304E−15
$C_2$ = −2.020E−05    $C_4$ = −3.6217E−09
$\lambda_0$ = 601.8 NM The Example 1 magnifier has a semi-field of 10.33 degrees, providing a semi-diagonal of 2.95 for a format of 3.1×5 mm, for an object placed at the rear surface of cover plate 8. The cover plate is approximately 0.93 mm thick and the space between it and surface $R_4$ is variable for focusing between 1.45 and 1.82 mm for an eye positioned in front of diaphragm 10, which is 35 mm in front of $R_1$.

The front element carrying surfaces $R_1$ and $R_2$ are made of a Schott glass (LAKN 22) having indices at wavelengths of 601.8, 590.5 and 611.8 Å equal to 1.6459, 1.6465 and 1.6453, respectively.

| SURF. 1 | C = 0.714597 | D = –0.4039180E-04 | F = –0.1637370E-08 |
|---|---|---|---|
|  | k = 0.0000000 | E = 0.1082030E-06 | G = –0.1888110E-11 |
|  | VERTEX RADIUS (1/C) = 13.9939 | | |
| SURF. 4 | C = 0.741966 | D = 0.1317330E-02 | F = –0.9026310E-05 |
|  | k = 0.0000000 | E = 0.7626560E-04 | G = 0.7396810E-06 |
|  | VERTEX RADIUS (1/C) = 13.4777 | | |

EXAMPLE 2

In Example 2, $R_1$ and $R_4$ are aspheres and spherical surface $R_2$ has a diffractive pattern:

TABLE 2

|  | RADIUS | THICKNESS | INDEX | V |
|---|---|---|---|---|
| 10 | DIAPHRAGM | 35.000 | | |
| $R_1$ | ASPHERE | 6.250 | 1.59 | 30.9 |
| $R_2$ | –138.6388 | 0.250 | | |
| $R_3$ | 24.9913 | 15.234 | 1.59 | 30.9 |
| $R_4$ | ASPHERE | | | |

The aspheric coefficients for $R_1$ and $R_4$ are:

| SURF. $R_1$ | C = 0.0712819 | D = –0.4002700E-04 | F = –0.1524500E-08 |
|---|---|---|---|
|  | k = 0.0000000 | E = 0.9801800E-07 | G = –0.1998500E-11 |
|  | VERTEX RADIUS (1/C) = 14.0288 | | |
| SURF. $R_4$ | C = 0.747032 | D = 0.1050900E-02 | F = –0.1629400E-04 |
|  | K = 0.0000000 | E = 0.1495100E-03 | G = 0.9862700E-06 |
|  | VERTEX RADIUS (1/C) = 13.3863 | | |

Coefficients for the diffractive surface $R_2$ are:

| $C_1 = -2.6839E-03$ | $C_3 = 2.5135E-07$ | $C_5 = 7.4828E-12$ |
|---|---|---|
| $C_2 = -6.0734E-06$ | $C_4 = -2.4004E-09$ | |
| $\lambda_0 = 601.8$ NM | | |

Example 2 has a semi-field of 10.33 degrees and a semi-diagonal of 2.95 for a 3.1 by 5 mm format. The cover plate 8 is approximately 0.93 mm thick and its distance from surface $R_4$ varies from 1.51 to 1.89 mm for focusing.

EXAMPLE 3

In Example 3, $R_1$ and $R_4$ are aspheres and $R_2$ has a diffractive pattern.

TABLE 3

|  | RADIUS | THICKNESS | INDEX | V |
|---|---|---|---|---|
| 10 | DIAPHRAGM | 35.000 | | |
| $R_1$ | ASPHERE | 6.250 | 1.59 | 30.9 |
| $R_2$ | –143.4110** | 0.250 | | |
| $R_3$ | 24.9913 | 15.234 | 1.59 | 30.9 |
| $R_4$ | ASPHERE | | | |

The coefficients for $R_1$ and $R_4$ are:

The coefficients for the diffractive surface $R_2$ are:

| $C_1 = -2.67278E-03$ | $C_3 = 2.73465E-07$ | $C_5 = 8/37743E-12$ |
|---|---|---|
| $C_2 = -6.77570E-06$ | $C_4 = -2.65724E-09$ | |
| $\lambda_0 = 601.8$ NM | | |

Example 3 has a semi-field of 10.33 degrees, providing a semi-diagonal of 2.95 for a format of 3.1 by 5 mm, for an object placed at the rear surface of cover plate 8. The cover plate is about 0.93 mm thick and its distance from surface $R_4$ is varied between 1.51 and 1.88 mm for focusing for an eye placed in front of diaphragm 10.

This magnifier uses conventional, relatively high index plastic in both elements.

EXAMPLE 4

Example 4 uses the same materials for both optical components as Example 1 but has aspheres on $R_1$, $R_3$ and $R_4$ and a diffractive pattern on $R_2$.

TABLE 4

|  | RADIUS | THICKNESS | INDEX | V |
|---|---|---|---|---|
| 10 | DIAPHRAGM | 35.000 | | |
| $R_1$ | ASPHERE | 5.900 | | |
| $R_2$ | 132.529[(2)] | 0.200 | | |
| $R_3$ | ASPHERE | 15.200 | 1.59 | 30.9 |
| $R_4$ | ASPHERE | | | |

The aspheric coefficients for $R_1$, $R_3$ and $R_4$ are:

| SURF. 1 | C = 0.645765 | D = 0.7594100E-05 | F = –0.1161100E-08 |
|---|---|---|---|
|  | k = 0.0000000 | E = 0.2164100E-06 | G = 0.2373000E-11 |
|  | R = 1/C = 15.4855 | | |
| SURF. 3 | C = 0.0645970 | D = 0.0 | F = 0.0 |

-continued

|     | | | |
|---|---|---|---|
|     | k = 2.9610000 | E = 0.0 | G = 0.0 |
|     | R = 1/C = | | |
|     | 15.4806 | | |
| SURF. 4 | C = 0.1067486 | D = 0.8380000E−03 | F = −0.1320800E−04 |
|     | k = 0.0000000 | E = 0.9502300E−04 | G = 0.1117000E−05 |
|     | R = 1/C = | | |
|     | 9.3678 | | |

The coefficients for the diffractive surface $R_2$ are:

| | | |
|---|---|---|
| $C_1 =$ −1.4600E−03 | $C_3$ = 6.2003E−07 | $C_5$ = 0.0 |
| $C_2$ = −3.1336E−05 | $C_4$ = −3.1047E−09 | |
| $\lambda_0$ = 601.8 NM | | |

Example 4 has a semi-field of 10.54 degrees, providing a semi-diagonal of 2.96 for a format of 3.1 by 5 mm, for an object placed at the rear surface of cover plate 8. The cover plate is 0.93 mm thick, and its distance is varied from 1.462 to 1.801 mm for focusing for an eye placed in front of diaphragm 10.

EXAMPLE 5

In Example 5, $R_1$, $R_2$ and $R_4$ are aspheres and $R_2$ contains a diffractive pattern.

TABLE 5

| | RADIUS | THICKNESS | INDEX | V |
|---|---|---|---|---|
| 10 | DIAPHRAGM | 35.000 | | |
| $R_1$ | ASPHERE | 5.900 | 1.60 | 38.0 |
| $R_2$ | −282.843$^{(2)}$ | 0.200 | | |
| $R_3$ | ASPHERE | 15.200 | 1.59 | 30.9 |
| $R_4$ | ASPHERE | | | |

In Example 5 the aspheric coefficients for $R_1$, $R_3$ and $R_4$ are:

|     | | | |
|---|---|---|---|
| SURF. $R_1$ | C = 0.0715958 | D = −0.9764700E−05 | F = 0.4155400E−09 |
|     | k = 0.0000000 | E = 0.3817900E−07 | G = 0.5780800E−11 |
|     | R = 1/C = | | |
|     | 13.9673 | | |
| SURF. $R_3$ | C = 0.456809 | D = 0.0 | F = 0.0 |
|     | k = −7.5220000 | E = 0.0 | G = 0.0 |
|     | R = 1/C = | | |
|     | 21.8910 | | |
| SURF. $R_4$ | C = 0.0943850 | D = 0.6190000E−03 | F = −0.1112600E−04 |
|     | k = 0.0000000 | E = 0.9618100E−01 | G = 0.8829700E−06 |
|     | R = 1/C = | | |
|     | 10.5949 | | |

The coefficients for the diffractive surface $R_2$ are:

| | | |
|---|---|---|
| $C_1$ = −2.1900E−03 | $C_3$ = 5.6166E−07 | $C_5$ = 0.0 |
| $C_2$ = −2.7000E−05 | $C_4$ = −2.4397E−09 | |
| $\lambda_0$ = 601.8 NM | | |

Example 5 has a semi-field of 10.54 degrees, providing a semi-diagonal of 2.96 for a format of 3.1 by 5.0 mm, for an object placed at the rear of cover plate 8. The cover plate is 0.93 mm and its distance from $R_4$ is varied from 1.45 to 1.82 for focusing with the eye in front of diaphragm 10.

Figure 2:
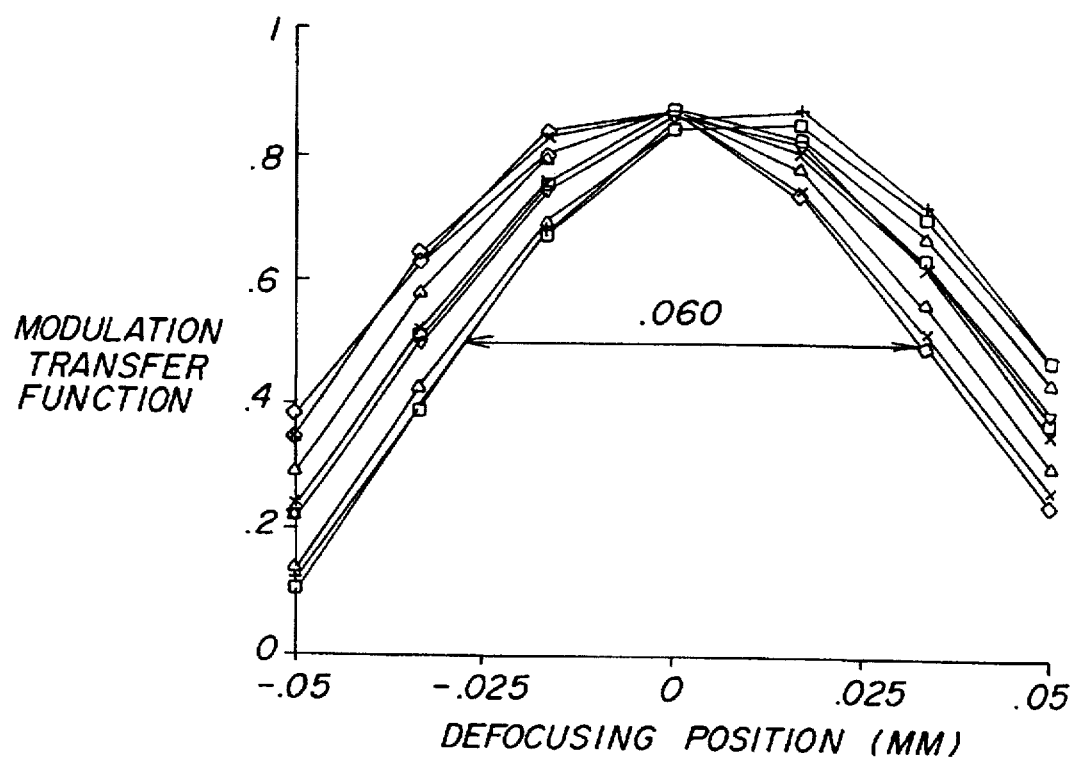
FIGS. 2–6 are through focus MTF curves.
Figure 3:
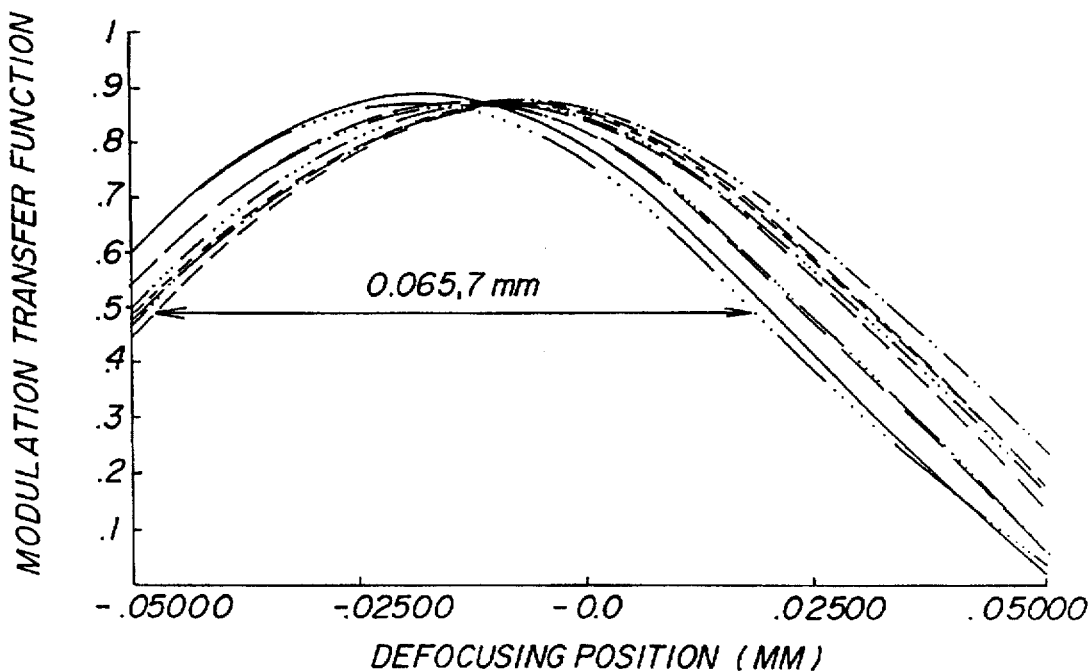
Figure 4:
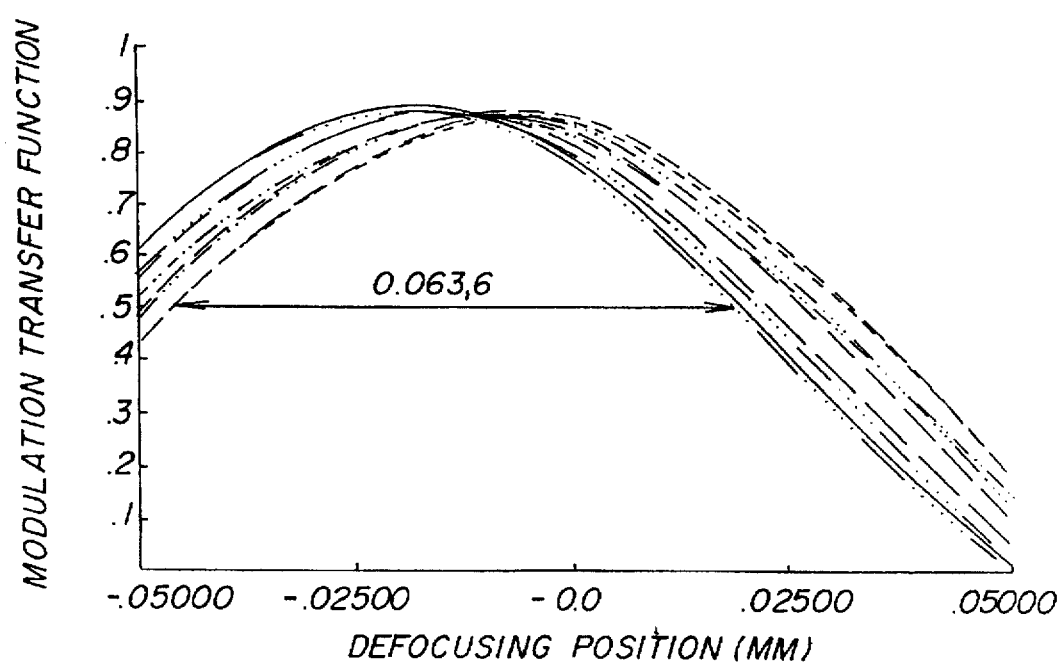
Figure 5:
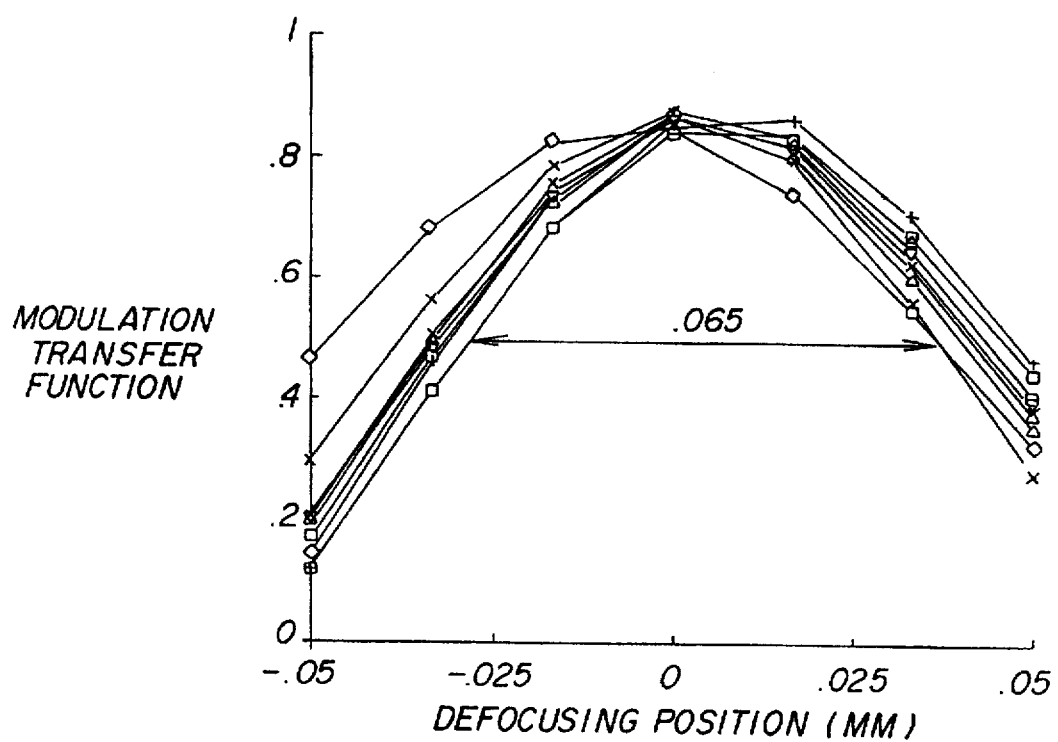
Figure 6:
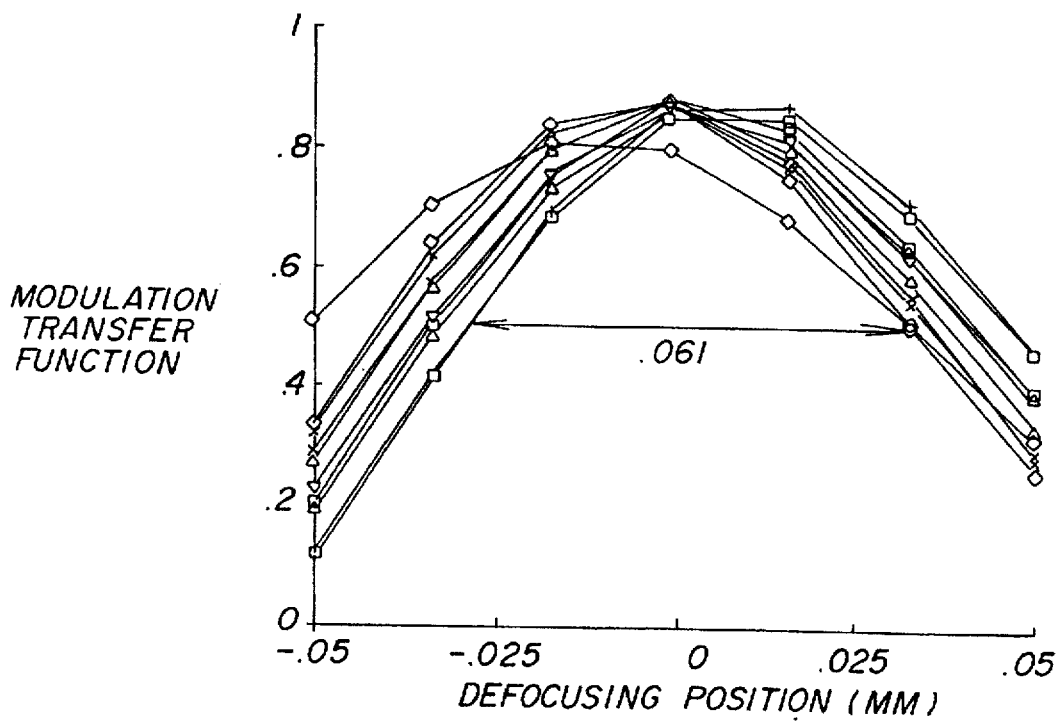

Through focus MTF (Modulation Transfer Function) curves for Examples 1 through 5 are shown in FIGS. 2–6, respectively. In those FIGS., the MTF is plotted against the amount of defocus in millimeters, for a set of tangential and radial rays from the axis to the full field of the system, for an object distance of −1500 millimeters, with a 6 millimeter pupil, at a spatial frequency of 50.0 cycles per millimeter. Each curve was substantially equally weighted for wavelengths 0.602, 0.591 and 0.612 microns. The depth of focus is measured at an MTF of 0.5.

The above examples satisfy a special need for a magnifier that has a relatively large stop distance, for example, twice the focal length of the lens. The lens is light weight, has minimal elements and provides exceptional performance for its cost. The front vertex-to-object is generally greater than about 1.3 times the effective focal length but does not exceed 1.5 times the focal length. The lens operates with an F/2 light bundle that covers a 20.7 degree full field with less than 30 percent vignetting.

The magnifier exhibits superior quality over a large wavelength range. The superior quality can be expressed as a peak-to-valley optical path difference that is no worse than ¼ to ⅜ of the wavelength when the lens is stopped to F/2.66. The depth of focus over 90 percent of the field of view at 50 lines per millimeter is greater than 0.06 millimeters at 50 percent modulation transfer function (even though the magnifier can be focused from infinity to 700 millimeters); see FIGS. 2–6. The wavelength range is 591 nanometers to 612 nanometers with the peak at 602 nanometers. The distortion is less than one percent over the full field of view. We know of no prior magnifier or eyepiece that provides this performance with only two elements. In fact, the performance may be unprecedented with respect to magnifiers having three or four elements as well.

The invention has been described in detail with particular reference to a preferred embodiment thereof, but it will be understood that variations and modifications can be effected within the spirit and scope of the invention as described thereinabove and as defined in the appended claims.

We claim:

1. An optical magnifier consisting of, from a front, eye side to a rear, object side, a first biconvex element and a second element, the second element consisting of two refractive surfaces, both of which are concave toward the object side and the magnifier having a diffractive surface on either the rear surface of the first biconvex element or the front surface of the second element.

2. An optical magnifier according to claim 1 having at least two surfaces that are aspheric.

3. An optical magnifier comprising, from a front, eyeside to a rear, object side, a first positive element and a second element, the second element having front and rear refractive surfaces, both of which are concave toward the object side, the rear refractive surface being positioned within 5 mm of an object to be viewed from the eyeside, said rear refractive surface being an aspheric surface of negative power positioned to correct field curvature associated with the object, the aspheric surface following a formula having aspheric terms which are positive.

4. An optical magnifier according to claim 3 wherein 0.0<S/EF<0.3, where EF is the focal length of the magnifier, S is the incremental sag of the aspheric surface at a clear aperture of the magnifier when H/EF is equal to 0.18 where H is the image height at full field.

5. An optical magnifier according to claim 3 wherein said aspheric surface complies with the general formula:

$$X = \frac{CY^2}{1 + \sqrt{1 - (k+1)C^2Y^2}} + DY^4 + EY^6 + FY^8 + GY^{10}$$

wherein C, D, E, F, G and k are aspheric coefficients and wherein at least D is positive.

6. An optical magnifier according to claim 3 wherein at least two of the surfaces are aspheric.

7. An optical magnifier constructed according to the following table in which $R_1$ through $R_4$ are the radii of curvature of the magnifier from a front eyeside to a rear object side, radii R, thicknesses and distances are in millimeters, the index is for the sodium D line of the spectrum and V is the abbe number, the aspheric coefficients fit the following general formula:

$$X = \frac{CY^2}{1 + \sqrt{1 - (k+1)C^2Y^2}} + DY^4 + EY^6 + FY^8 + GY^{10}$$

and the diffractive surfaces are described by the following phase equation:

$$\Phi(Y) = \frac{2\pi}{\lambda_0} [C_1Y^2 + C_2Y^4 + C_3Y^6 + C_4Y^8 + C_5Y^{10}]$$

| | RADIUS | DISTANCE OR THICKNESS | INDEX | V |
|---|---|---|---|---|
| 10 | DIAPHRAGM | 35.000 | | |
| $R_1$ | ASPHERE | 5.900 | | |
| $R_2$ | ASPHERE | 0.200 | | |
| $R_3$ | 41.8407 | 15.200 | 1.590 | 30.9 |
| $R_4$ | ASPHERE | | | |

The coefficients for surfaces $R_1$, $R_2$ and $R_4$ are:

| SURF. | | | |
|---|---|---|---|
| $R_1$ | C = 0.0712810<br>k = 0.0000000<br>R = 1/C = 14.02898 | D = -0.4235000E-04<br>E = 0.3181400E-06 | F = -0.2637200F-08<br>G = 0.1004800E-11 |
| SURF. $R_2$ | C = -0.0187855<br>k = 0.0<br>R = 1/C = 11.9126 | D = 0.2948800E-04<br>E = 0.6327600E-04 | F = 0.0<br>G = 0.6879400E-06 |
| SURF. $R_4$ | C = 0.0839447<br>k = 0.0<br>R = 1/C = 11.9126 | D = 0.1068000E-02<br>E = 0.6327600E | F = -0.8642300E-05<br>G = 0.6879400E-06 |

Coefficients for the diffractive surface $R_2$ are:

| | | |
|---|---|---|
| $C_1$ = -1.399E-03 | $C_3$ = 5.0503E-07 | $C_5$ = -2.1304E-15 |
| $C_2$ = -2.020E-05 | $C_4$ = -3.6217E-09 | |
| $\lambda_0$ = 601.8 NM | | |

8. An optical magnifier constructed according to the following table in which $R_1$ through $R_4$ are the radii of curvature of the magnifier from a front eyeside to a rear object side, radii R, thicknesses and distances are in millimeters, the index is for the sodium D line of the spectrum and V is the abbe number, the aspheric coefficients fit the following general formula:

$$X = \frac{CY^2}{1 + \sqrt{1 - (k+1)C^2Y^2}} + DY^4 + EY^6 + FY^8 + GY^{10}$$

and the diffractive surfaces are described by the following phase equation:

$$\Phi(Y) = \frac{2\pi}{\lambda_0} [C_1Y^2 + C_2Y^4 + C_3Y^6 + C_4Y^8 + C_5Y^{10}]$$

| | RADIUS | THICKNESS | INDEX | V |
|---|---|---|---|---|
| 10 | DIAPHRAGM | 35.000 | | |
| $R_1$ | ASPHERE | 6.250 | 1.59 | 30.9 |
| $R_2$ | -138.6388 | 0.250 | | |
| $R_3$ | 24.9913 | 15.234 | 1.59 | 30.9 |
| $R_4$ | ASPHERE | | | |

The aspheric coefficients for $R_1$ and $R_4$ are:

| SURF. | | | |
|---|---|---|---|
| $R_1$ | C = 0.0712819<br>k = 0.0000000<br>VERTEX RADIUS (1/C) = 14.0288 | D = -0.4002700E-04<br>E = 0.9801800E-07 | F = -0.1524500E-08<br>G = -0.1998500E-11 |
| SURF. $R_4$ | C = 0.747032<br>K = 0.0000000<br>VERTEX RADIUS (1/C) = 13.3863 | D = 0.1950900E-02<br>E = 0.1495100E-03 | F = -0.1629400E-04<br>G = 0.9862700E-06 |

Coefficients for the diffractive surface $R_2$ are:

| | | |
|---|---|---|
| $C_1$ = -2.6839E-03 | $C_3$ = 2.5135E-07 | $C_5$ = 7.4828E-12 |
| $C_2$ = -6.0734E-06 | $C_4$ = -2.4004E-09 | |
| $\lambda_0$ = 601.8 NM | | |

9. An optical magnifier constructed according to the following table in which $R_1$ through $R_4$ are the radii of curvature of the magnifier from a front eyeside to a rear object side, radii R, thicknesses and distances are in millimeters, the index is for the sodium D line of the spectrum and V is the abbe number, the aspheric coefficients fit the following general formula:

$$X = \frac{CY^2}{1 + \sqrt{1 - (k+1)C^2Y^2}} + DY^4 + EY^6 + FY^8 + GY^{10}$$

and the diffractive surfaces are described by the following phase equation:

$$\Phi(Y) = \frac{2\pi}{\lambda_0} [C_1Y^2 + C_2Y^4 + C_3Y^6 + C_4Y^8 + C_5Y^{10}]$$

| | RADIUS | THICKNESS | INDEX | V |
|---|---|---|---|---|
| 10 | DIAPHRAGM | 35.000 | | |
| $R_1$ | ASPHERE | 6.250 | 1.59 | 30.9 |
| $R_2$ | -143.4110 | 0.250 | | |
| $R_3$ | 24.9913 | 15.234 | 1.59 | 30.9 |
| $R_4$ | ASPHERE | | | |

The coefficients for $R_1$ and $R_4$ are:

| SURF. 1 | C = | 0.714597 | D = | −0.403918E−04 | F = | −0.1637370E−08 |
|---|---|---|---|---|---|---|
| | k = | 0.0000000 | E = | 0.1082030E−06 | G = | −0.1888110E−11 |
| | VERTEX RADIUS (1/C) = | 13.9939 | | | | |
| SURF. 4 | C = | 0.741966 | D = | 0.1317330E−02 | F = | −0.9026310E−05 |
| | k = | 0.0000000 | E = | 0.7626560E−04 | G = | 0.7396810E−06 |
| | VERTEX RADIUS (1/C) = | 13.4777 | | | | |

The coefficients for the diffractive surface $R_2$ are:

| $C_1$ = | −2.67278E−03 | $C_3$ = | 2.73465E−07 | $C_5$ = | 8/37743E−12 |
|---|---|---|---|---|---|
| $C_2$ = | −6.77570E−06 | $C_4$ = | −2.65724E−09 | | |
| $\lambda_0$ = | 601.8 NM | | | | |

The coefficients for the diffractive surface $R_2$ are:

| $C_1$ = | −1.4600E−03 | $C_3$ = | 6.2003E−07 | $C_5$ = | 0.0 |
|---|---|---|---|---|---|
| $C_2$ = | −3.1336E−05 | $C_4$ = | −3.1047E−09 | | |
| $\lambda_0$ = | 601.8 NM | | | | |

10. An optical magnifier constructed according to the following table in which $R_1$ through $R_4$ are the radii of curvature of the magnifier from a front eyeside to a rear object side, radii R, thicknesses and distances are in millimeters, the index is for the sodium D line of the spectrum and V is the abbe number, the aspheric coefficients fit the following general formula:

$$X = \frac{CY^2}{1+\sqrt{1-(k+1)C^2Y^2}} + DY^4 + EY^6 + FY^8 + GY^{10}$$

and the diffractive surfaces are described by the following phase equation:

$$\Phi(Y) = \frac{2\pi}{\lambda_0}[C_1Y^2 + C_2Y^4 + C_3Y^6 + C_4Y^8 + C_5Y^{10}]$$

| | RADIUS | THICKNESS | INDEX | V |
|---|---|---|---|---|
| 10 | DIAPHRAGM | 35.000 | | |
| $R_1$ | ASPHERE | 5.900 | | |
| $R_2$ | 132.529 | 0.200 | | |
| $R_3$ | ASPHERE | 15.200 | 1.59 | 30.9 |
| $R_4$ | ASPHERE | | | |

The aspheric coefficients for $R_1$, $R_3$ and $R_4$ are:

11. An optical magnifier constructed according to the following table in which $R_1$ through $R_4$ are the radii of curvature of the magnifier from a front eyeside to a rear object side, radii R, thicknesses and distances are in millimeters, the index is for the sodium D line of the spectrum and V is the abbe number, the aspheric coefficients fit the following general formula:

$$X = \frac{CY^2}{1+\sqrt{1-(k+1)C^2Y^2}} + DY^4 + EY^6 + FY^8 + GY^{10}$$

and the diffractive surfaces are described by the following phase equation:

$$\Phi(Y) = \frac{2\pi}{\lambda_0}[C_1Y^2 + C_2Y^4 + C_3Y^6 + C_4Y^8 + C_5Y^{10}]$$

| | RADIUS | THICKNESS | INDEX | V |
|---|---|---|---|---|
| 10 | DIAPHRAGM | 35.000 | | |
| $R_1$ | ASPHERE | 5.900 | 1.60 | 38.0 |
| $R_2$ | −282.843 | 0.200 | | |
| $R_3$ | ASPHERE | 15.200 | 1.59 | 30.9 |
| $R_4$ | ASPHERE | | | | the aspheric coefficients for $R_1$, $R_3$ and $R_4$ are:

| SURF. 1 | C = | 0.645765 | D = | 0.7594100E−05 | F = | −0.1161100E−08 |
|---|---|---|---|---|---|---|
| | k = | 0.0000000 | E = | 0.2164100E−06 | G = | 0.2373000E−11 |
| | R = | 1/C = 15.4855 | | | | |
| SURF. 3. | C = | 0.0645970 | D = | 0.0 | F = | 0.0 |
| | k = | 2.9610000 | E = | 0.0 | G = | 0.0 |
| | R = | 1/C = 15.4806 | | | | |
| SURF. 4 | C = | 0.1067486 | D = | 0.8380000E−03 | F = | −0.1320800E−04 |
| | k = | 0.0000000 | E = | 0.9502300E−04 | G = | 0.1117000E−05 |
| | R = | 1/C = 9.3678 | | | | |

| SURF. $R_1$ | C = | 0.0715958 | D = | −0.9764700E−05 | F = | 0.4155400E−09 |
|---|---|---|---|---|---|---|
| | k = | 0.0000000 | E = | 0.3817900E−07 | G = | 0.5780800E−11 |
| | R = | 1/C = 13.9673 | | | | |
| SURF. $R_3$ | C = | 0.456809 | D = | 0.0 | F = | 0.0 |
| | k = | −7.5220000 | E = | 0.0 | G = | 0.0 |
| | R = | 1/C = 21.8910 | | | | |
| SURF. $R_4$ | C = | 0.0943850 | D = | 0.6190000E−03 | F = | −0.1112600E−04 |
| | k = | 0.0000000 | E = | 0.9618100E−01 | G = | 0.8829700E−06 |
| | R = | 1/C = 10.5949 | | | | |

The coefficients for the diffractive surface $R_2$ are:

| | | | | | |
|---|---|---|---|---|---|
| $C_1 =$ | -2.1900E-03 | $C_3 =$ | 5.6166E-07 | $C_5 =$ | 0.0 |
| $C_2 =$ | -2.7000E-05 | $C_4 =$ | -2.4397E-09 | | |
| $\lambda_0 =$ | 601.8 NM | | | | |

12. An optical magnifier consisting of, from a front, eye side to a rear, object side:
- a first biconvex element and a second element, the second element consisting of two refractive surfaces, both of which are concave toward the object side;
- the magnifier having a diffractive surface on either the rear surface of the first biconvex element or the front surface of the second element;
- wherein said magnifier has at least two aspheric surfaces defined by $$X = \frac{CY^2}{1+\sqrt{1-(K+1)C^2Y^2}} + DY^4 + EY^6 + FY^8 + GY^{10}$$

where, D, E, F, G and K are aspheric coefficients and wherein each of said two aspheric surfaces has at least one aspheric coefficient that is non-zero.

13. An optical magnifier according to claim 12 wherein the rear surface of the second element is a negative aspheric surface which follows a formula having a positive sag from a corresponding spherical curvature.

14. An optical magnifier according to claim 12 wherein 0.0<S/EF<0.3, where EF is the focal length of the magnifier, S is the incremental sag of the negative aspheric surface at a clear aperture of the magnifier when H/EF is equal to 0.18 where H is the image height at full aperture.

15. An optical magnifier according to claim 13 wherein said aspheric surface complies with the general formula:

$$X = \frac{CY^2}{1+\sqrt{1-(k+1)C^2Y^2}} + DY^4 + EY^6 + FY^8 + GY^{10}$$

and wherein C, D, E, F, G and k are constants and wherein D is positive.

* * * * *